Dec. 13, 1955    F. C. WOELFER    2,726,790
GREASE SUPPLY SYSTEMS
Filed July 22, 1950    2 Sheets-Sheet 1

INVENTOR.
Frank C. Woelfer
BY
Wood, Arey, Henon & Evans
ATTORNEYS

Dec. 13, 1955        F. C. WOELFER        2,726,790
GREASE SUPPLY SYSTEMS
Filed July 22, 1950        2 Sheets—Sheet 2
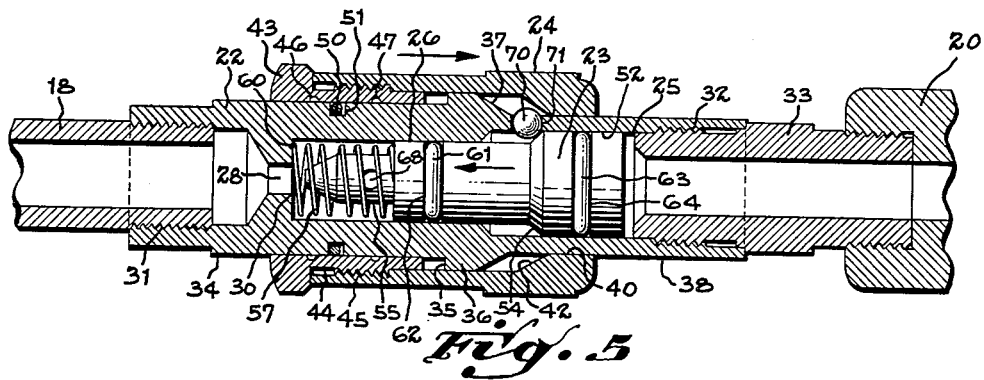
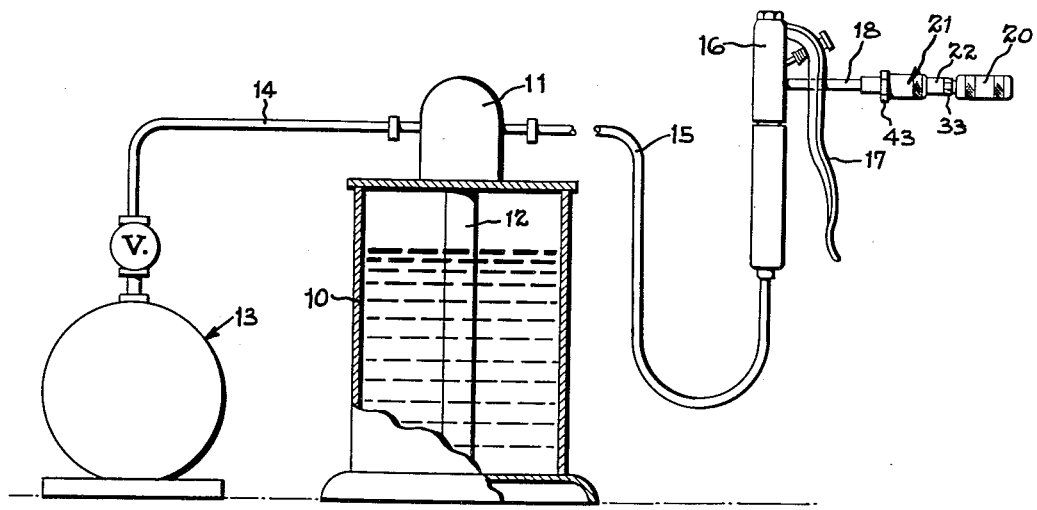
INVENTOR.
Frank C. Woelfer
BY
Wood, Arey, Henon & Evans
ATTORNEYS United States Patent Office 2,726,790
Patented Dec. 13, 1955

2,726,790

GREASE SUPPLY SYSTEMS

Frank C. Woelfer, Cincinnati, Ohio, assignor to Balcrank, Inc., Cincinnati, Ohio, a corporation of Ohio Application July 22, 1950, Serial No. 175,324

7 Claims. (Cl. 222—122)

This invention is directed to an improved grease supply system, of the type utilized for greasing automobiles and the like, which has adjacent the discharge end means for controlling the pressure at which grease is delivered to the parts being lubricated.

The ordinary grease supply system utilized for lubricating automobiles and the like consists primarily of a lubricant reservoir, a pump, a grease conduit, a control valve near the end of the conduit, and a coupler for attaching the end of the conduit to grease fittings on the parts to be lubricated.

Such a system usually supplies grease to the fittings at a high, substantially constant pressure, the pump maintaining a pressure head at the control valve in the neighborhood of 6000–8000 lb. per sq. in. This pressure level is required in order to force grease through fittings into "frozen" bearings, or parts tightly packed with dirt or hardened grease. However, such pressure is apt to be injurious if applied to certain parts of an automobile such as the wheel bearings, water pump or other less sturdy parts. Then too, many bearings are provided with accurately fitted seals which serve to retain grease, and in order that these seals continue to operate efficiently they should never be subjected to the high pressure delivered by grease supply systems under normal operation. In addition, certain cast parts are not designed to withstand these high pressures. Thus, it can be seen that in order to grease an automobile or the like properly, means must be provided for delivering the grease at the discharge end of the system at two pressures, a high pressure, normally used for heavy bearings, frozen fittings and the like, and a low pressure for parts less sturdy in construction.

In general, two methods have been proposed. In one method, the pump is designed to deliver grease at a high pressure, usable at the majority of fittings in a modern automobile, and some means employed for reducing the pressure when necessary. Pressure control valves have been utilized, the valves being manually adjustable to reduce pressures to a safe level; but most of the pressure reducing valves proposed have been rather expensive and, in almost every instance, adapted to be installed in the system only at some point near the pump, or actually in the pump, so that it is required of the mechanic, when adjusting from high to low pressure operation or vice versa, to return to the pump in order to make each change.

Another method utilized quite extensively comprises employing an automatic high pressure pump only for greasing the parts which can be lubricated at high pressures and then changing to a low pressure hand operated grease gun for lubricating the parts which would be injured by high pressures. This method of operation is safe but even more time consuming than the method using pressure reducing valves in or at the pump.

Before the recent development of universal type greases, that is, those which are adapted to be used on all parts of an automobile, the time required for a mechanic to return to the pump in order to reduce pressures or to select a low pressure grease gun made little difference in the total time required to complete a lubrication job; because the mechanic usually had to leave the job in order to change greases or grease guns for the different parts anyway. With universal type greases available, it has become highly desirable to provide a device for controlling the grease delivery pressure which is located at the discharge end of the system, and which is in the mechanic's hands while he is lubricating the different parts, so that it is possible for him to complete a job without ever leaving the automobile. The advantages of such a system are many. The resulting decrease in the time required for lubrication is of course one of the most important factors. In addition, however, by providing a grease supply system which can be changed from high to low pressure operation or vice versa to handily, it is quite apparent that a mechanic who otherwise might not be overly conscientious in using the correct pressures is going to use them if the means for changing from one to the other is constantly at hand.

It is therefore an object of the present invention to provide an improved grease supply system which includes a small, light and relatively inexpensive pressure control unit which is at the grease discharge end of the system. In the preferred embodiment, the pressure control unit is just slightly larger than a conventional coupler and is installed directly in the grease conduit line, adding little if any noticeable weight.

Another object of the invention is to provide a pressure control unit which is of such construction that once set to deliver grease at a certain pressure, the setting is not apt to be accidentally altered.

A further object of the invention is to provide a pressure control unit which is exceedingly simple to operate and which is impelled by the pressure in the conduit line.

Additionally, it is an object of the invention to provide a pressure control unit which may be quickly and easily adjusted to deliver lubricant at high or low pressure without leakage of grease.

In the preferred embodiment of the invention, grease is drawn from a reservoir and forced at high pressure by an air operated pump through a flexible conduit or hose to a control valve which is adjacent the discharge end of the system. The control valve preferably is a pistol grip type and includes a handle or trigger for controlling the flow of the high pressure grease. Attached to the control valve is a short lance, i. e., a length of rigid tubing, which has at its end a coupler for attachment to fittings on the parts to be lubricated. Between the coupler and the control valve, the pressure control unit is installed, preferably at the place usually grasped by a mechanic with his free hand when placing the coupler against a fitting. Thus placed, since the control unit has but two positions of adjustment, corresponding to high and low pressure, it can be adjusted without the mechanic having to look at it, the setting of the unit being ascertainable by touch.

In the system, the trigger operated valve regulates the flow of grease while the control unit regulates the pressure available at the coupler. Thus, while the grease reservoir and pump may be located at a place remote from the point of lubrication, the operator greasing an automobile has within his hands the coupler to connect the conduit to a fitting, a device for starting and stopping the flow of grease, and a unit for controlling the effective grease pressure of the system.

As a safety feature, the pressure control unit is designed so that it can be adjusted or changed from one pressure setting to another only when the coupler is disconnected from a fitting. Thus, once set, and with grease pressure building up in the part being lubricated, there is no danger of the mechanic accidentally shifting from low to high pressure grease delivery position and thereby damaging the part being lubricated. In fact, the unit is self-locking in the two positions of adjustment when grease is flowing through it under pressure. The shift from one setting to another is simply a matter of sliding an exposed sleeve, which surrounds the unit, from one position to another. In the operation of the system, the shift can be made while the mechanic is moving from one fitting to the next.

Under high pressure operation, the flow of grease through the control unit is comparatively unrestricted and the discharge pressure is substantially equal to the pump pressure, line drop due to friction etc., accounting for only a slight loss. In high pressure operation, a pressure regulating plunger inside of the unit is initially locked in set position by a novel and simple cam lock device which is positive acting and once grease is flowing, is maintained in locking position by the pressure of the grease so that it is practically impossible to disturb the setting.

On the other hand, when the sleeve is adjusted to low pressure operating position, the cam-lock device is released and the plunger moved into and maintained in low pressure position by the action of the grease pressure in the line. Or in other words, unless positively locked out of such position, the plunger is impelled to low pressure position whenever grease flows through the unit. Thus, the holding force necessary to maintain the plunger in this position comes from within the system. If by any chance a mechanic does not move the sleeve completely into either pressure position, as defined by a pair of detents, the plunger automatically snaps into safe, low pressure maintaining position. The danger of careless application of high pressure thus is kept at a minimum; because, in order to operate at high pressure the unit must be locked in such position, requiring a positive, conscious act upon the part of the mechanic.

The parts of the control unit are relatively few in number. In fact, the unit is rather simple in construction, and can be manufactured quite economically. There are three main parts, a pressure regulating plunger, a housing, and a sleeve. The housing is machined internally to provide a pair of cylindrical bores, one being smaller in diameter than the other, with the larger one toward the outlet side of the housing. At the inlet side of the housing a grease flow control orifice is provided which opens into the smaller of the two cylindrical bores. The pressure regulating plunger is machined to provide two piston portions of such diameter as to engage the respective cylinder bores within the housing in slip-fit relationship. In addition, the plunger includes a frusto-conical nose which is adapted to seat in the flow control orifice in the position of the plunger corresponding to a setting of low pressure operation. The plunger is adapted to move from a position in which it is thus seated to a second position in which it is removed from the orifice toward the outlet side of the unit for high pressure operation.

The plunger includes an axial bore which extends from the larger piston end to a point just behind the conical nose where it branches at lateral openings. Thus, with the plunger nose unseated with respect to the orifice, there is an unrestricted passageway through the entire unit so that grease issuing from the outlet side of the unit is substantially at pump pressure. The cam-lock device, under the control of the slidable sleeve, serves to positively hold the plunger in this position. In addition, a slight coil spring which is seated between the orifice and the plunger is provided to urge the plunger toward the position for locking.

When the unit is subjected to grease pressure, the difference in the exposed areas at the two ends of the plunger causes the plunger to be impelled, counter to the direction of grease flow, toward seating position at the orifice. Once seated at the orifice, the effective exposed areas are: at the inlet side, the area of the orifice; at the discharge side, the area of the larger cylinder minus the area of the smaller cylinder. Thus, when the plunger is not locked away from the orifice, the pressure drop through the unit is substantially in the ratio of the effective exposed areas at the two ends of the plunger; or in other words, in the ratio of larger cylinder area minus smaller cylinder area divided by orifice area. Of course, there is some discrepancy due to frictional losses, etc. For example, it has been found that a ratio between piston areas of 8 to 1 results in an actual ratio of pressures somewhere around 6–6.5 to 1; or in other words, with an operating pump pressure of 8000 lb. per sq. in., and a low pressure setting at the control unit, the pressure available at the discharge end of the system is somewhere in the neighborhood of 1250 lb. per sq. in.

It should be borne in mind that the drop in pressure through the unit is primarily a function of the ratio referred to above and, therefore, any desired drop for a particular pump pressure can be attained by designing the piston plunger and housing accordingly.

The construction and operation of such a grease supply system as well as its advantages will be readily apparent from the following description of the drawings in which:

Figure 5 is a cross sectional view somewhat similar to Figure 3, showing the plunger and cam-lock mechanism in their positions at the time that the plunger is being released from high pressure locked position.

Figure 6 is a diagrammatic view illustrating the preferred grease delivery system of this invention.

Figure 1:
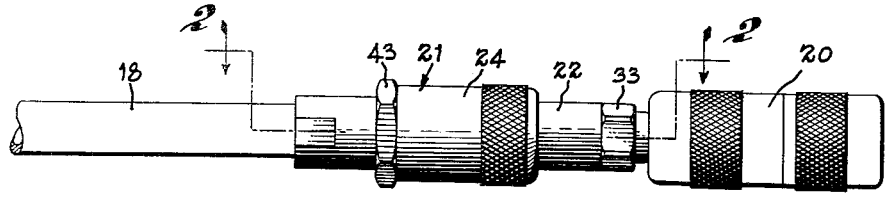
Figure 1 is a side elevational view of the discharge end of a grease supply system showing the pressure control unit in its operative connection with the lance and coupler.

Referring to Figure 6, a grease reservoir is shown at 10. Mounted at the top of the reservoir 10 is an air operated pump 11 having an intake tube 12 which depends into the reservoir 10 and through which the grease is lifted by the pump. The pump preferably is of the type which incorporates an air motor (not shown). The motive power for the air motor may be a conventional compressed air outfit such as that shown generally at 13, the compressed air being led from the outfit 13 to the pump by means of tubing 14. At the discharge end of pump 11 a flexible conduit or hose 15 is provided, the conduit being of any convenient length. Near the discharge end of the conduit 15, a trigger operated control valve 16 is inserted in the line. In the preferred embodiment, valve 16 is of the type which permits the flow of grease only when the handle or trigger 17 is depressed. At the discharge side of the control valve 16, a lance 18 is provided, the lance being made of some rigid material such as metal tubing or the like. At the very end of the lance a conventional coupler 20 is attached, the coupler being adapted to engage with grease fittings on the parts to be lubricated. In the lance line between the coupler and the control valve, a pressure control unit 21 is installed. It will be noted that the pressure control unit is in such a position that it can be grasped quite handily by the free hand of a mechanic when holding the control valve 16.

In the grease system described, the air operated pump maintains high pressure in the system up to the trigger operated control valve 16. Preferably, the pump is of the type which starts operating whenever the pressure in the line at the discharge side of the pump falls below a predetermined pressure level, which is just slightly under normal operating pressure, and stops automatically, or stalls out, when the maximum pressure is reestablished in the line. When control valve 16 is closed, there is no pressure in the line beyond it. Thus, the control unit 21 and the coupler are not subjected to grease pressure with valve 17 thus closed. When the coupler 20 is snapped onto a grease fitting and control valve 16 is opened, the grease pressure starts building up in the part being lubricated and, if the control unit is set for high pressure, continues to do so until a pressure level inside the fitting is attained which is substantially that of the pump, the pump automatically shutting off when this level is reached.

When the pressure control valve 21 is set for low pressure operation under these conditions, the same thing occurs at the pump inasmuch as the pressure inside the system between the pump and the control unit is at the high level even though the pressure in the line beyond the control unit is at a low level. In either type operation, once the mechanic, with the control valve 16 open, hears the pump motor stop, he knows that the fitting has received sufficient grease and can then close control valve 16 and remove the coupler 20 from the fitting. With control valve 16 closed, there is no pressure at the coupler and consequently no grease leakage from it when the mechanic is moving from one fitting to the next. In fact, one of the advantages of the present system is that there is no grease leakage from the coupler or from the control unit 21. In the control unit, the grease passages are sealed off from the outside so that even when the unit is being shifted from one pressure setting to another, there is no possibility of grease leakage.

In general, the pressure control unit 21 comprises three basic parts, a housing 22, a plunger 23 and a shell or sleeve 24. The housing is bored and then counter-bored to provide two internal cylinders 25 and 26 which meet at a tapered shoulder 27 near the middle of the housing. The cylinder 25 is larger than cylinder 26 and is toward the discharge end of the unit. Adjacent the intake side of the unit, a restricted orifice 28 is provided, the inner marginal edge of the orifice providing a seat 30. At the inlet end, the housing is threaded internally as at 31 for threaded engagement with the end of lance 18. At the opposite end, that is, the discharge end, the housing is also threaded internally as at 32 for threaded engagement with an adaptor nipple 33 which provides means for joining the control unit with the coupler 20.

Externally, the housing is machined to provide a cylindrical portion 34 toward the inlet end thereof, which terminates in a shoulder 35 located near the middle of the housing. The shoulder 35 is part of an annular collar 36 extending around the housing and which has its face opposite the shoulder 35 tapered conically as at 37. Toward the discharge side of the housing from the conical face 37 the housing is machined off to provide a cylindrical portion 38. The shell or sleeve 24 slides on the cylindrical portions 38 and 34 surrounding the housing. Toward the discharge side of the unit the shell 24 includes an internal bore 40 which is of such a size that it engages cylindrical portion 38 in slip-fit relationship. The opposite end of housing 24 is counter-bored internally as at 41 to engage the periphery of collar 36 in slip-fit relationship. Between the two cylindrical portions 34 and 38 the housing tapers to provide an annular cam face 42. The shell or housing 24 is secured in place on the housing by means of a coupler nut 43 which includes a threaded sleeve portion 44 engaged around the housing in slip-fit relationship upon the cylindrical portion 34. The sleeve portion 44 is threaded as at 45, and the sleeve 24 provided with internal threads so that the coupler nut 43 and sleeve may be threaded together to provide a unitary assembly.

The sleeve is adapted to be moved into either one of two operating positions. These positions are defined by a pair of spaced detent grooves 46 and 47 which are machined into the inner wall of the sleeve portion 44 of coupling nut 43. These two detent grooves are adapted to cooperate with a split retaining ring 50 which is engaged about housing 24 within an annular groove 51. The split ring is of the type which tends to expand outwardly so that when one of the grooves 46 or 47 is brought into a position opposite it, the ring snaps into the groove, thus holding the sleeve in place.

The valve plunger 23 is mounted within the housing. The plunger includes two piston areas. One of these, indicated by the numeral 52, is substantially larger than the other, indicated at 53, the two piston portions of the plunger being designed to engage the two cylinder bores 25 and 26 respectively in slip-fit relationship. Between the two piston areas, the plunger is machined conically to provide a cam face 54. Toward the inlet side of the unit the plunger includes a nose portion 55 which terminates in a frusto-conical tip 56 which is designed to seat against edge 30 at the orifice 28. A light coil spring 57 is disposed about nose section 55 of the plunger within cylinder 26, the coil spring seating at one end against a shoulder 58 on the plunger and at the other end upon the shoulder 60 surrounding orifice 28. The light coil spring is designed to urge the plunger toward the outlet side of the unit. In both piston portions, O-ring packing glands, fashioned from synthetic rubber or the like, are provided. The one for the smaller piston portion 53 is indicated at 61, being mounted within annular groove 62. The other ring is indicated at 63 and is mounted within annular groove 64 in piston portion 52.

Figure 3:
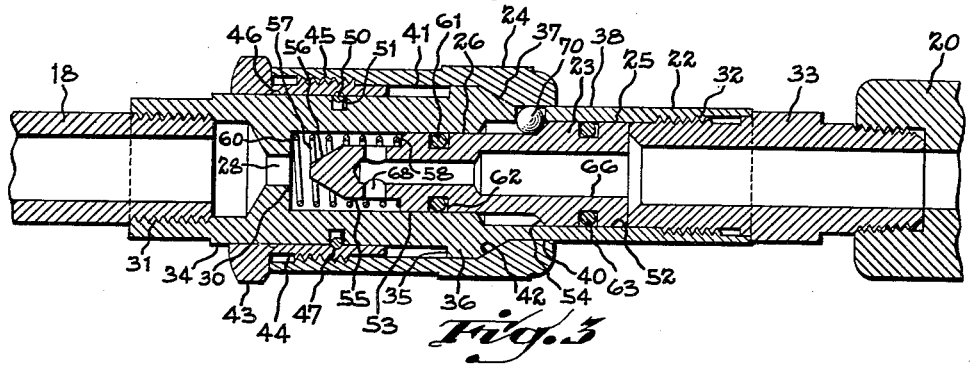
Figure 3 is a view similar to Figure 2 in which the plunger is shown in high pressure position.

The plunger is bored internally as at 66 to provide passageway for the discharge of grease therethrough. Bore 66, starting at the discharge end of the plunger, communicates with axial bore 67 within the plunger which terminates within the nose portion 55 of the plunger behind the conical tip 56. At this point, a lateral bore 68 is provided, the bore 68 providing branching passageways from bore 67 so that grease passing through the orifice 28 can enter bores 67 and 66. It will be noted that with nose 56 removed from orifice 28, there is substantially an unrestricted passageway for the grease to move at approximate pump pressure completely through the unit. This condition is shown in Figure 3.

Figure 2:
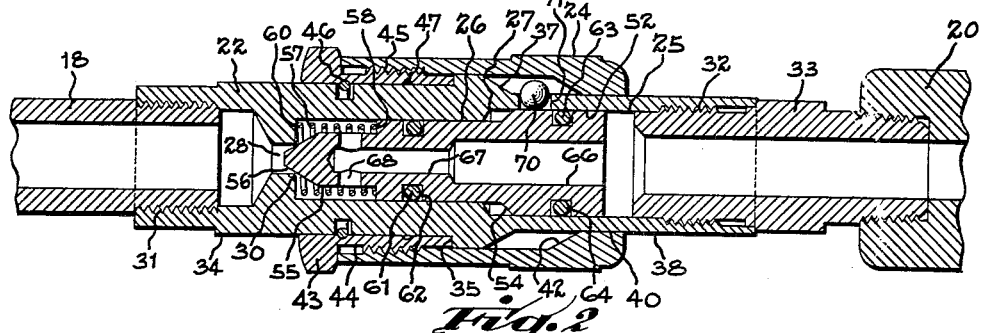
Figure 2 is a cross sectional view through the control unit taken on line 2—2 of Figure 1, showing the plunger in low pressure position.

With nothing restraining the plunger and with grease moving through the unit, the difference in the exposed areas of the respective ends of the plunger causes it to move toward the inlet end of the housing so that the frusto-conical nose 56 tends to seat upon edge 30 at orifice 28. This condition or position of the parts is shown in Figure 2 of the drawings. Equilibrium is established within the unit when the effective forces, that is, pressure $x$ area, upon opposite ends of the plunger are in balance. In order to establish such equilibrium, the smaller exposed area at the inlet end of the plunger must be subjected to a greater pressure than is the larger exposed area at discharge end of the plunger. Or in other words, with nose 56 seated, the forces (lb. per sq. in.) acting on the plunger are: pump pressure multiplied by cross sectional area of orifice 28, acting on the inlet end; and, acting on the discharge end, the remainder of cross sectional area of larger cylinder 25 minus cross sectional area of smaller cylinder 26, multiplied by the pressure at the discharge side. Thus, the two pressures established are in the ratio of the difference in the cross sectional areas of the respective cylinders divided by the cross sectional area of the orifice.

When the coupler 20 is engaged upon a fitting and the trigger 17 of the control valve 16 released, grease starts to flow through the unit and the pressure starts building up within the part being lubricated and continues to do so until a point is reached where the two pressures are in the ratio described above, at which time the flow of grease is stopped.

In the embodiment shown, this ratio is approximately 8 to 1 so that with a pump pressure somewhere in the neighborhood of 8000 lb. per sq. in., the theoretical drop in pressure past the plunger is 7000 lb. per sq. in., and the pressure in the fitting of the part being lubricated is only 1000 lb. per sq. in. This figure is theoretical inasmuch as it does not take into account the frictional losses resulting from the O-rings 61 and 63 or the force of spring 57, so that in actual practice with the above figures, pressure delivered to the fitting is somewhat higher, or somewhere in the neighborhood of 1250 lb. per sq. in.

Figure 4:
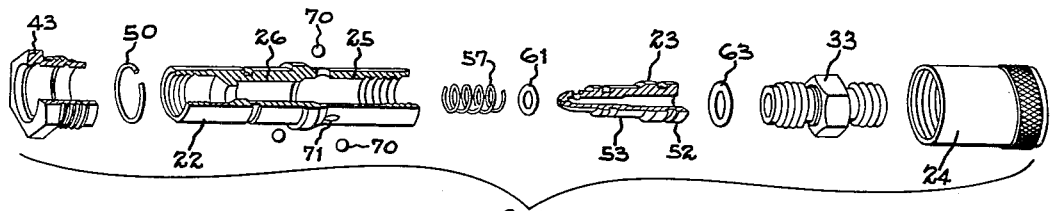
Figure 4 is an exploded view showing the component parts of the pressure control unit in perspective, with some of the parts broken away to more clearly illustrate their construction.

In low pressure operation, whenever the pressure in the part being lubricated approaches the 1250 lb. per sq. in. mark or thereabouts, the flow of grease is stopped even though control valve 16 is still open. Thus, in the present construction, means are provided for locking the plunger in a position removed from orifice 28 in order to provide high pressure operation, such as is required for the majority of the parts of the modern automobile and for frozen fittings and the like. In the present embodiment the lock comprises three small hard metal balls similar to those used in ball-bearings, these being indicated at 70 (see Figure 4). The balls are seated within lateral bores 71 which pierce the walls of the housing at the discharge side of the unit just off tapered face 37. The balls are greater in diameter than the thickness of the wall of the housing at this point so that when plunger 23 is in the position shown in Figure 2 the balls rest upon piston 52. With no pressure in the control unit (valve 16 closed), spring 57 pushes the plunger to the position shown in Figure 3 and by moving the sleeve 24 toward the intake side of the unit the tapered surface 42 within the sleeve forces the balls inwardly in a camming action to seat against the tapered face 54 on the plunger, the inner surface of bore 40 engaging the balls at the time. In this position of the sleeve, split ring 50 is engaged within the detent groove 47. Preferably, the parts are designed so that the inner end of nipple 33 abuts the discharge side end of plunger 23 when the plunger is in high pressure position.

Under pressure, there is a greater holding force on the sleeve tending to hold it in a setting for high pressure operation than that provided merely by split ring 50. It will be noted that the balls wedge outwardly against the lateral bores 71 in which they are seated when the plunger under the action of the pressure tends to move toward the intake side of the unit. Under these circumstances, the balls press upon the inner surface of bore 40 with substantial force so that it is practically impossible to move the sleeve accidently from high pressure position once pressure is being built up in the line. Thus, when set in this position, there is no danger of a mechanic inadvertently moving the sleeve to low pressure position and as a result delivering grease at an inadequate pressure to the particular part being lubricated at the time.

In order to shift from locked or high pressure operation into low pressure operation, the sleeve 24 is moved toward the discharge end of the unit which action is shown in Figure 5 of the drawings. The sleeve is moved to a place in which detent groove 46 is engaged by split ring 50. In this position, balls 70 are free to be cammed out of bores 71 by the tapered face 54 on the plunger upon its moving toward seating position at orifice 28. This movement occurs when the grease pressure within the part being lubricated builds up to a point where friction and the slight force of spring 57 are overcome by the back pressure upon the plunger.

The spring 57 is not necessary in order to have the unit operate, however, it insures positive action. If the spring 57 were omitted, the plunger would move to high pressure operating position the instant the trigger operated control valve 16 were released and grease started to flow, and once in such position could be locked by shifting the sleeve to the position shown in Figure 3 of the drawings. This arrangement would necessitate moving the sleeve to locked position after the discharge of a little grease and before pressure has a chance to build up in the part being lubricated to a point where the plunger would be forced into low pressure operation by the resulting back pressure. Alternatively, the same end could be attained without coupling onto a fitting by simply discharging a little grease to waste. It is preferred, however, that the spring be utilized, inasmuch as one of the advantages to the preferred construction is that the shifting from one pressure setting to another can be accomplished without such waste.

Having described my invention, I claim:

1. A grease supply system comprising; a grease reservoir, a grease conduit, a pump adapted to draw grease from the reservoir and force it through the grease conduit at a substantially high pressure, a flow control valve near the end of the grease conduit, a coupler at the end of the grease conduit, and a pressure control unit installed in the grease conduit between the coupler and flow control valve, said pressure control unit having a housing configurated internally to provide grease passageway therethrough, slidable means disposed within the housing adapted to move into a position in response to grease pressure in which it is effective for maintaining in the system beyond the unit grease pressure which is substantially lower than the grease pressure in the system between the unit and the pump, and a slidable sleeve surrounding said housing adapted to cooperate with said slidable means for locking said slidable means in a second position in which it is ineffective.

2. A grease supply system comprising; a grease reservoir; a grease conduit; a pump adapted to draw grease from the reservoir and force it through the grease conduit at a substantially high pressure; a flow control valve near the end of the grease conduit; a coupler at the end of the grease conduit; and a pressure control unit installed in the grease conduit between the coupler and flow control valve: said pressure control unit comprising; a housing having an inlet and an outlet; said housing configurated internally to provide two cylinders disposed end to end, with the cylinder toward the outlet being larger in diameter than the cylinder toward the inlet, and a flow control orifice which opens from the inlet into the smaller cylinder; a plunger disposed within the housing having two piston heads adapted to engage the respective cylinders in slip-fit relationship, whereby one head is exposed to grease pressure inside the larger cylinder and the outer exposed to grease pressure inside the smaller cylinder; a nose at the end of the plunger toward the inlet; said plunger having a grease passageway extending therethrough from a point behind the tip of the nose; said plunger adapted to move in response to grease pressure acting upon the respective piston heads to a position in which the nose blocks said orifice, whereby a pressure differential is established in the system at the two ends of the plunger; and a sleeve slidably mounted upon the housing adapted to cooperate with locking means for locking said plunger in a position in which the nose is removed from the orifice whereby grease can pass freely through the unit substantially at pump pressure.

3. A pressure control unit adapted to be installed in a high pressure grease supply system adjacent the discharge end thereof comprising; a housing having an inlet and an outlet, said housing configurated internally to provide a grease passageway therethrough and to provide a constricted orifice in the passageway adjacent the inlet end thereof, a plunger slidable in said passageway said plunger having a conical nose at the end adjacent said orifice, said plunger adapted to be impelled counter to the direction of grease flow to a position in which said conical nose is within and blocking said orifice in response to a build-up of back pressure of grease in the system beyond the unit, and means for positively locking said plunger in a position removed from said orifice blocking position, said means comprising a sleeve surrounding and slidably mounted upon said housing for manual movement longitudinally thereof, a bore extending through the wall of the housing in a radial direction, a ball disposed within said bore, an annular cam surface surrounding said plunger and adapted to register with the inner end of said bore when said plunger is in said position with its nose removed from said orifice, and an internal cam surface on said slidable sleeve engageable with said ball upon movement of the sleeve as aforesaid to force said ball inwardly through the bore and into wedging engagement with the cam surface on said plunger to prevent longitudinal movement of the plunger to said position in which its nose blocks said orifice.

4. A pressure control unit adapted to be installed in a high pressure grease supply system adjacent the discharge end thereof comprising; a housing having an inlet and an outlet, said housing configurated internally to provide a constricted orifice adjacent the inlet which opens into a pair of cylinders disposed end to end, the cylinder toward the inlet being smaller in diameter than the cylinder toward the outlet, a plunger disposed within the housing having piston portions adapted to engage the respective cylinders in slip-fit relationship, a nose at the end of the plunger toward the inlet, said plunger having a grease passageway extending therethrough from a point adjacent the nose, said plunger adapted to move in response to grease pressure acting upon the respective piston portions to a pressure reducing position in which said nose is within and blocking said orifice, whereby a pressure differential is established in the system at the two ends of the plunger in which the pressure beyond the plunger is substantially lower than the pressure up to the plunger, spring means effective only when the plunger is not subjected to grease pressure for urging said plunger to a position in which the nose is removed from said orifice, and means for positively locking the plunger in the latter position whereby grease can pass freely through the unit, said means comprising a sleeve surrounding and slidably mounted upon said housing for manual movement longitudinally thereof, a bore extending through the wall of the housing in a radial direction, a ball disposed within said bore, an annular cam surface surrounding said plunger and adapted to register with the inner end of said bore when said plunger is in said position with its nose removed from said orifice, and an internal cam surface on said slidable sleeve engageable with said ball upon movement of the sleeve as aforesaid to force said ball inwardly through the bore and into wedging engagement with the cam surface on said plunger to prevent longitudinal movement of the plunger to said position in which its nose blocks said orifice.

5. A pressure control unit adapted to be installed in a high pressure grease supply system adjacent the discharge end thereof comprising: a housing having an inlet and an outlet; said housing configurated internally to provide two cylinders disposed end to end, with the cylinder toward the outlet being larger than the one toward the inlet, and a flow control orifice which is between the inlet and the smaller cylinder; a double diameter plunger having two oppositely disposed piston heads, one head being responsive to inlet pressure the other to back pressure; said plunger reciprocally mounted in the housing with the respective piston heads within the respective cylinders; said plunger having a passageway connecting said smaller and larger cylinders; a nose at the inlet end of the plunger; said plunger adapted to move in response to grease pressure acting upon the respective piston heads to a position in which the nose is seated within the orifice, whereby a pressure differential, substantially in the ratio of the areas of the respective piston heads, is established in the system at the two ends of the plunger; and means for positively locking the plunger at a point remote from the flow control orifice to permit a free flow of grease through the unit, said means comprising a sleeve surrounding and slidably mounted upon said housing for manual movement longitudinally thereof, a bore extending through the wall of the housing in a radial direction, a ball disposed within said bore, an annular cam surface surrounding said plunger and adapted to register with the inner end of said bore when said plunger is in said position with its nose removed from said orifice, and an internal cam surface on said slidable sleeve engageable with said ball upon movement of the sleeve as aforesaid to force said ball inwardly through the bore and into wedging engagement with the cam surface on said plunger to prevent longitudinal movement of the plunger to said position in which its nose blocks said orifice.

6. A grease supply system comprising a grease reservoir, a grease conduit, a pump adapted to draw grease from the reservoir and force it through the grease conduit at a substantially high pressure, a flow control valve adjacent the end of the grease conduit, a coupler at the end of the grease conduit, and a pressure control unit installed in the grease conduit between said coupler and said flow control valve, said pressure control unit including a housing having an inlet and an outlet, said housing configurated internally to provide a grease passageway therethrough and to provide a constricted orifice in the passageway adjacent the inlet end thereof, a plunger slidable in said passageway, said plunger having a conical nose at the end adjacent said inlet, said plunger adapted to be impelled counter to the direction of the grease flow in the system to a position in which said conical nose is within and blocking said orifice in response to a build-up of back pressure of grease in the system beyond the unit for maintaining in the system beyond the unit grease pressure which is substantially lower than the grease pressure in the system between the unit and the pump, plunger locking means, and a slidable sleeve surrounding said housing adapted to cooperate with said locking means for locking the plunger in a position removed from said orifice blocking position in which it is ineffective.

7. A grease supply system comprising a grease reservoir, a grease conduit, a pump adapted to draw grease from the reservoir and force it through the grease conduit at a substantially high pressure, a flow control valve adjacent the end of the grease conduit, a coupler at the end of the grease conduit, and a pressure control unit installed in the grease conduit between the coupler and flow control valve, said pressure control unit including a housing, slidable means disposed within said housing, said slidable means adapted to move into a position in response to grease pressure in which it is effective for maintaining in the system beyond the unit grease pressure which is substantially lower than the grease pressure in the system between the unit and the pump, and means accessible at the outside of said housing adapted for releasably locking said slidable means in a second position in which it is ineffective.

References Cited in the file of this patent

UNITED STATES PATENTS

| | | |
|---|---|---|
| 457,056 | McNeil | Aug. 4, 1891 |
| 543,448 | Lowe | July 23, 1895 |
| 614,441 | Burnett | Nov. 22, 1898 |
| 1,173,518 | Hoxsie | Feb. 29, 1916 |
| 1,624,130 | Beggs | Apr. 12, 1927 |
| 1,871,291 | Adams | Aug. 9, 1932 |
| 1,896,036 | Bell | Jan. 31, 1933 |
| 2,128,636 | Davis | Aug. 30, 1938 |
| 2,404,119 | Zanolli | July 16, 1946 |
| 2,423,482 | Chochol | July 8, 1947 |
| 2,463,253 | Earle | Mar. 1, 1949 |